(No Model.)

J. W. AKERMAN.
DELIVERY WAGON.

No. 571,324. Patented Nov. 17, 1896.

WITNESSES:
C. Gist
A. M. Cusack

INVENTOR
John W. Akerman
BY
Edgar Tate & Co
ATTORNEYS.

THE NORRIS PETERS CO., PHOTO-LITHO., WASHINGTON, D. C.

UNITED STATES PATENT OFFICE.

JOHN WALTER AKERMAN, OF NEWBURYPORT, MASSACHUSETTS.

DELIVERY-WAGON.

SPECIFICATION forming part of Letters Patent No. 571,324, dated November 17, 1896.

Application filed February 14, 1896. Serial No. 579,239. (No model.)

*To all whom it may concern:*

Be it known that I, JOHN WALTER AKERMAN, a citizen of the United States, and a resident of Newburyport, in the county of Essex and State of Massachusetts, have invented certain new and useful Improvements in Delivery-Wagons, of which the following is a specification, reference being had to the accompanying drawings, forming a part thereof, in which similar letters of reference indicate corresponding parts.

This invention relates to delivery-wagons and other and similar vehicles; and the object thereof is to provide an improved vehicle of this class which is provided with a body portion in which the articles to be delivered are placed and principally within the front thereof, and the seat for the driver being arranged at the rear part thereof, and said rear part being also provided with a depressed portion or chamber which is adapted to serve as a receptacle for the feet and legs of the driver, and in which certain articles or packages may also be stored; and with this and other objects in view the invention consists in the construction, combination, and arrangement of parts hereinafter described and claimed.

The invention is fully disclosed in the following specification, of which the accompanying drawings form a part, in which—

Figure 1:
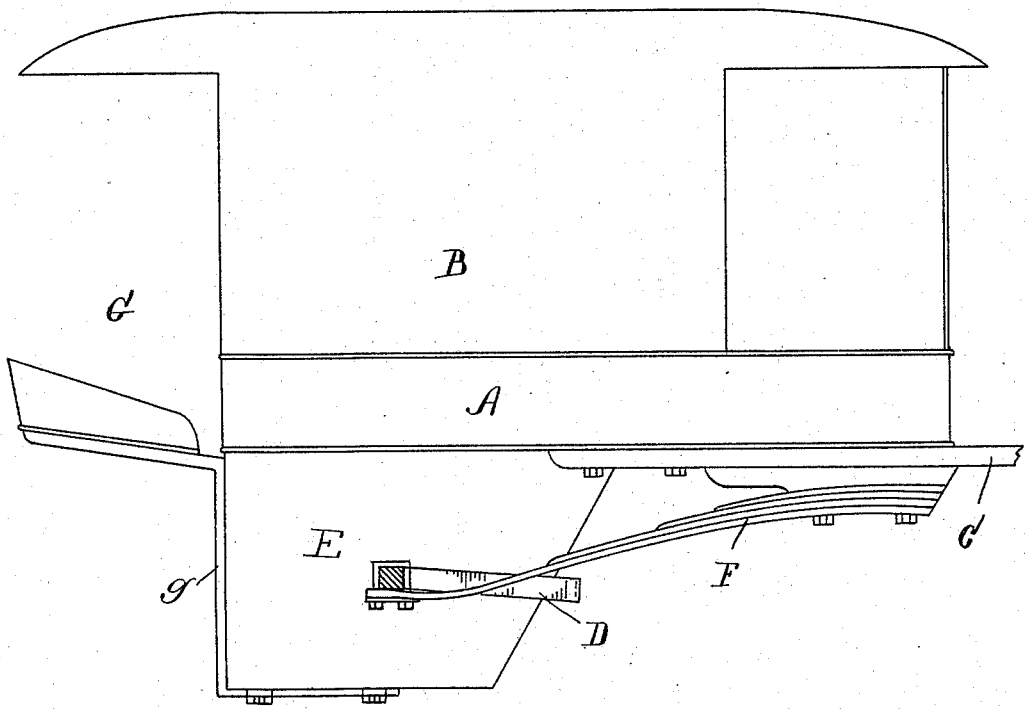
Figure 2:
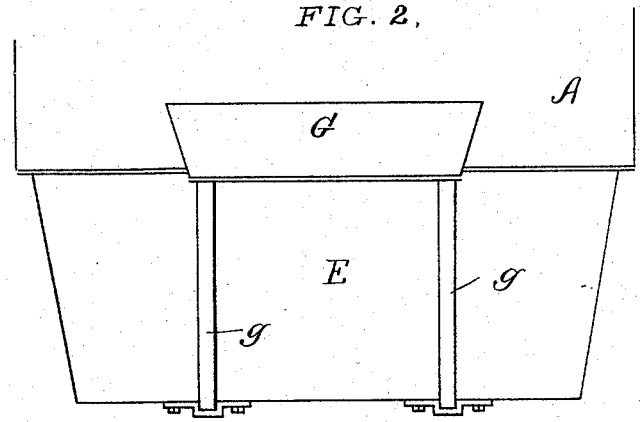

Figure 1 is a side view of the body portion of my improved delivery-wagon, the wheels and running-gear being omitted; and Fig. 2, a rear view thereof.

In the practice of my invention I provide a delivery-wagon which comprises a body portion A, having a top B, and to which are secured the usual shafts C, but one of which is shown, and the body portion A of the wagon is provided at the rear end thereof with a depressed chamber or receptacle E, the side of which is shown in Fig. 1, and the front of which is shaped as shown in Fig. 1, being upwardly and outwardly inclined, and the sides thereof as shown in Fig. 2, said sides being downwardly and inwardly inclined. I also provide an axle D, which is angular in form and adapted to inclose the front portion of the downwardly-directed extension E, and the ends of this axle project at each side and the wheels (not shown) are mounted thereon, and the forward part of the body A is supported by springs F, which connect with said axle.

The driver's seat G is arranged at the back of the body A and is supported by angular braces g, which are detachably connected with the downwardly-directed extension or depending portion E, and by means of this arrangement the articles to be delivered will always be in front of the driver, and when the wagon-body is supported by the axle D, arranged as herein described, there will be comparatively but slight movement of said body caused by the movement of the horse, and the weight of the wagon-body, the articles therein, and the driver will be almost equally balanced upon the axle.

The interior of the body A and the top B may be arranged in any desired manner, the only object in this connection being to arrange the same so as to accommodate the interior thereof to carrying the greatest possible number of articles to be delivered; but this arrangement forms no part of my invention, and is therefore not shown and described.

Having fully described my invention, I claim as new and desire to secure by Letters Patent—

1. In a delivery-wagon, a wagon-body, the rear end of which is provided with a depending extension or compartment and a seat which is connected therewith, and extends outwardly behind the wagon-body, and an axle which is angular in form and incloses the front portion of said depending extension, or compartment, substantially as shown and described.

2. In a delivery-wagon, a wagon-body, the rear end of which is provided with a depending extension or compartment and a seat which is connected therewith, and extends outwardly behind the wagon-body, and an axle which is angular in form and incloses the front portion of said depending extension or compartment, and the forward portion of the wagon-body being supported by springs which are connected therewith, and with said axle at the side of said depending extension or compartment, substantially as shown and described.

In testimony that I claim the foregoing as my invention I have signed my name, in presence of the subscribing witnesses, this 7th day of February, 1896.

JOHN WALTER AKERMAN.

Witnesses:
LOUIS H. TOPPAN,
GEO. LOWELL MERRILL.